United States Patent [19]

Briggs, III

[11] Patent Number: 5,729,003
[45] Date of Patent: Mar. 17, 1998

[54] APPARATUS FOR PREVENTING FORMATION OF CONDENSATION ON AN ELECTROOPTICAL SCANNER WINDOW

[75] Inventor: Templeton Briggs, III, Snohomish, Wash.

[73] Assignee: Intermec Corporation, Everett, Wash.

[21] Appl. No.: 579,292

[22] Filed: Dec. 27, 1995

[51] Int. Cl.⁶ .................................................. G06K 7/10
[52] U.S. Cl. .................. 235/472; 235/454; 359/509; 359/512
[58] Field of Search ........................... 235/472, 454; 359/507, 509, 512, 513, 514

[56] References Cited

U.S. PATENT DOCUMENTS

| | | | |
|---|---|---|---|
| 2,442,913 | 6/1948 | Abrams et al. | 359/512 X |
| 4,355,861 | 10/1982 | Sebald | 359/512 |
| 5,378,883 | 1/1995 | Batterman et al. | 235/472 |
| 5,471,036 | 11/1995 | Sperbeck | 359/512 X |
| 5,508,505 | 4/1996 | Walts et al. | 235/472 |

FOREIGN PATENT DOCUMENTS

| | | |
|---|---|---|
| 59-214819 | 12/1984 | Japan . |
| 1-40923 | 2/1989 | Japan . |
| 3-12582 | 1/1991 | Japan . |
| 1527621 | 10/1978 | United Kingdom . |

Primary Examiner—Donald T. Hajec
Assistant Examiner—Michael G. Lee
Attorney, Agent, or Firm—Graham & James LLP

[57] ABSTRACT

A scanner for scanning a one or two-dimensional bar code symbology is provided that effectively prevents condensation from forming on the protective window. The scanner comprises a housing having an electro-optical element and a window permitting the electro-optical element to collect reflected light therethrough. A heating element is coupled to at least a peripheral portion of the inner surface of the window. Application of an electrical current to the heating element heats the window and precludes condensation from forming on the inner surface of the window. The heating element may further comprise a resistive element having an adhesive layer permitting attachment to the inner surface of the window. The heating element would be further compatible with operation of conventional electro-optical elements, such as a charge coupled device or a laser.

16 Claims, 2 Drawing Sheets

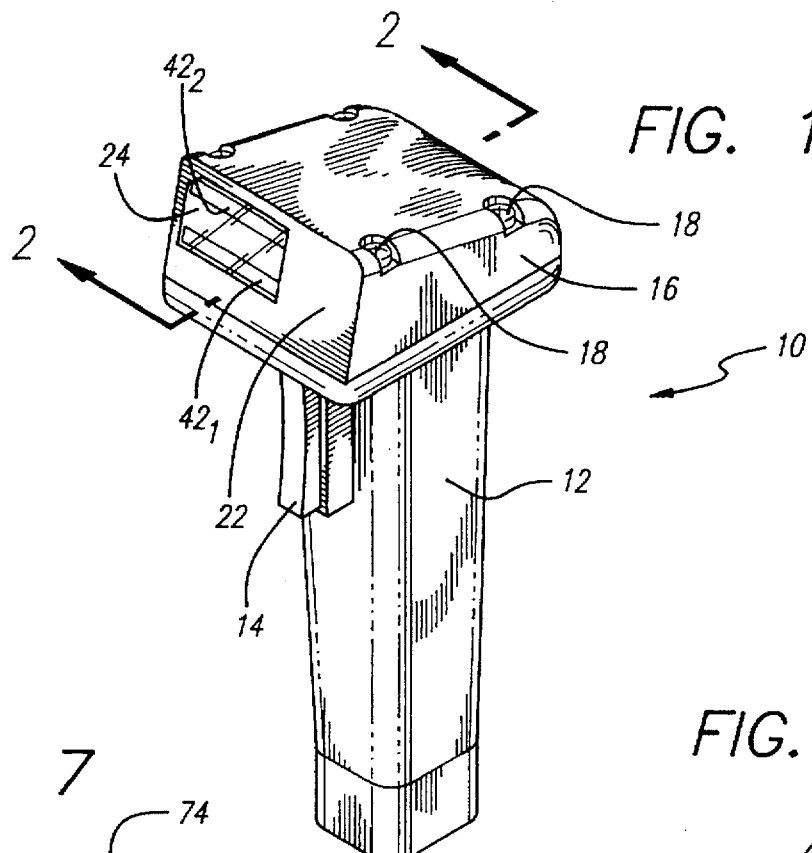
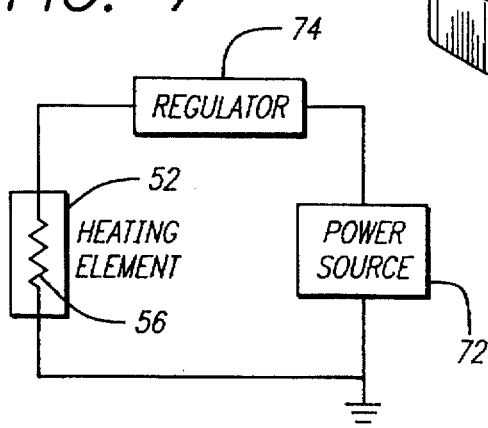
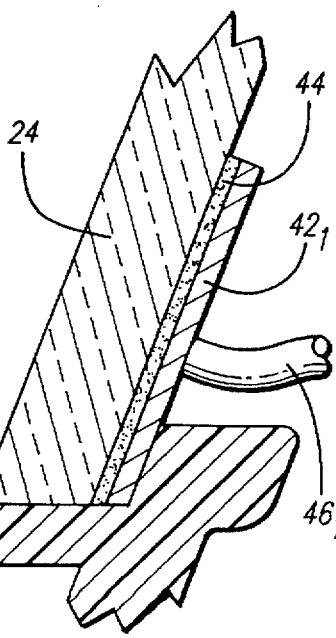
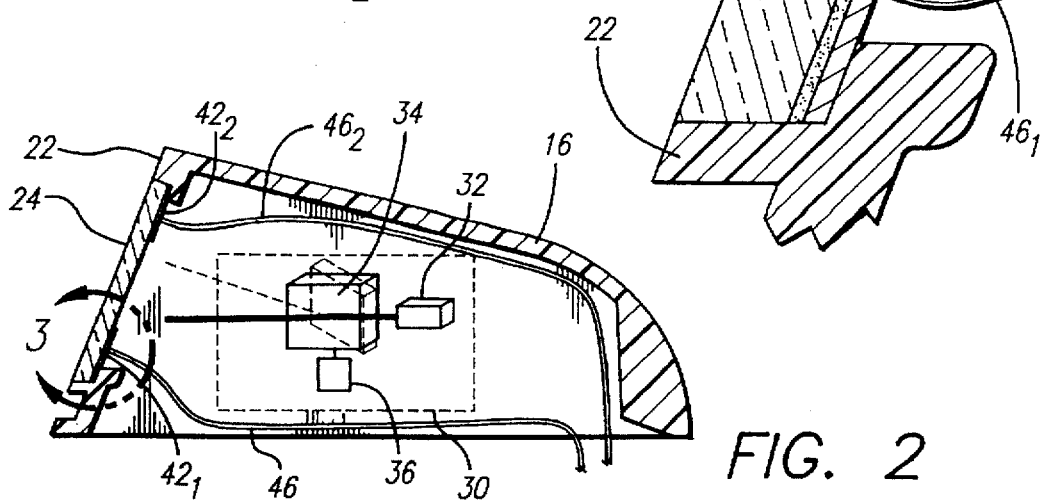

APPARATUS FOR PREVENTING FORMATION OF CONDENSATION ON AN ELECTROOPTICAL SCANNER WINDOW

BACKGROUND OF THE INVENTION

1. Field of the Invention

The present invention relates to electro-optical scanners for reading a one or two-dimensional bar code symbology, and more particularly, to a portable scanner capable of being brought from a warm to a cold environment without undesirable fogging of a protective window that covers the electro-optical systems.

2. Description of Related Art

Optical imaging systems are commonly used to decipher data symbols printed on objects in order to identify the objects. A bar code symbol represents a common one-dimensional form of symbology, and comprises a pattern of vertical bars of various widths separated by spaces of various widths. Since the bar and space elements have different light reflecting characteristics, a reader can convert the symbology into an electrical signal by analyzing the light reflected from the symbol. The electrical signal can then be decoded to provide an alphanumeric representation of the symbol which identifies the object. Bar code symbols of this nature are now in common usage in various applications, such as inventory control, point of sale identification, or logistical tracking systems.

The bar code reader or scanner typically uses a light source that is scanned across the bar code field. Since the bar code symbology is often disposed on the object to be identified, it is desirable for the reader to be included in a hand held or portable device so that the reader can be brought to the object. Lasers are often utilized with movable mirrors that automatically articulate the laser light back and forth at a high rate to scan across the bar code field. The optical components are generally disposed within a compartment of the portable device behind a window that protects the optical components from damage due to physical contact or environmental effects.

Since the conventional one-dimensional symbology requires a relatively large amount of space to convey a correspondingly small amount of data, so-called two-dimensional bar code symbologies have been developed. A two-dimensional symbology may comprise a matrix that occupies a uniform amount of space having a generally rectangular or square shape. Instead of bars and spaces, round or square characters disposed at particular rows and columns of the matrix correspond to the information being conveyed. As a result, a two-dimensional matrix symbology can compress significantly more data into a given volume of space than a conventional one-dimensional bar code.

Two-dimensional symbology scanners convert the matrix data into pixel information that is deciphered into the alphanumeric information represented by the matrix. Such scanners often utilize charge-coupled device (CCD) technology to convert optical information from the matrix into an electrical signal representation of the matrix. Like the one-dimensional bar code readers, the two-dimensional scanners may be provided in a portable device, with the CCD element disposed behind a protective window.

A significant drawback of portable one and two-dimensional symbology scanners is that the protective window tends to become fogged under certain operating conditions. Portable scanners are often used in refrigerated conditions, such as within commercial freezers and warehouses. Moreover, portable scanners are also used in outdoor recreational and industrial environments such as ski areas and oil rigs in which the operating temperature is very low. When the portable scanner is taken from a warm environment into such a cold environment, condensation rapidly forms on the protective window due to vaporized water droplets in the ambient air within the scanner. While condensation on the outer surface of the protective window can be readily cleaned away, it can be more problematic when the condensation forms on the inner surface of the window. Operation of the optical components of the scanner would be significantly degraded under such conditions since the condensation diffuses the laser light and obscures the two-dimensional image formed by the CCD element. Since an operator cannot easily disassemble the scanner to gain access to the inner surface of the protective window, the operator has no recourse but to set the scanner aside until the condensation clears.

Accordingly, a critical need exists for a low cost method and apparatus for preventing condensation from forming on the protective window of a portable one or two-dimensional scanner, without increasing the cost and/or complexity of such scanners.

SUMMARY OF THE INVENTION

In accordance with the teachings of the present invention, a scanner for scanning a one or two-dimensional bar code symbology is provided that effectively prevents condensation from forming on the protective window.

Particularly, the scanner comprises a housing having an electro-optical element and a window permitting the electro-optical element to collect reflected light therethrough. A heating element is coupled to at least a peripheral portion of the inner surface of the window. Application of an electrical current to the heating element heats the window and precludes condensation from forming on the inner surface of the window. The heating element may further comprise a resistive element having an adhesive layer permitting attachment to the inner surface of the window. The heating element would be further compatible with operation of conventional electro-optical elements, such as a charge coupled device or a laser.

A more complete understanding of the scanner window fog preventer will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

Fig. 1 is a perspective view of an electro-optical scanner having a heating element of the present invention;

FIG. 2 is a partial sectional side view of the electro-optical scanner, taken through the section 2—2 of FIG. 1;

FIG. 3 is an enlarged sectional side view taken through the section 3—3 of FIG. 2;

FIG. 7 is a schematic diagram illustrating operation of the heating element.

DETAILED DESCRIPTION OF THE PREFERRED EMBODIMENT

Figure 4:
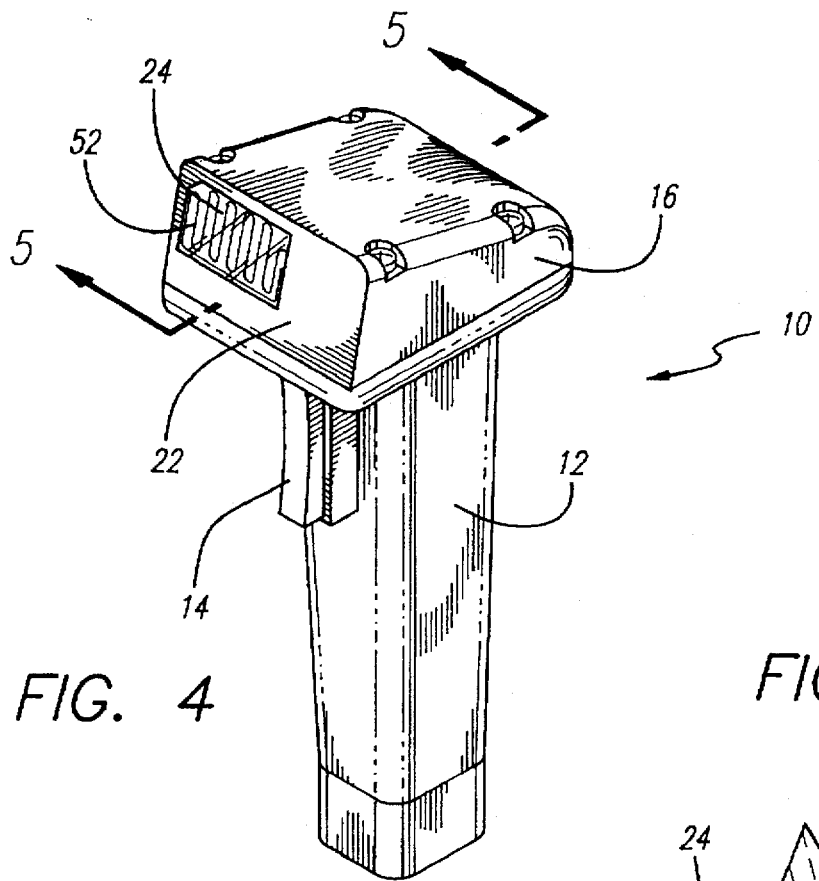
Fig. 4 is a perspective view of an electro-optical scanner having an alternative heating element.

The present invention satisfies the critical need for a low cost method and apparatus for preventing condensation from forming on the protective window of a portable one or two-dimensional bar code scanner. In the detailed description that follows, like reference numerals are used to describe like elements in one or more of the figures.

Referring first to FIG. 1, an electro-optical scanner 10 is illustrated. The electro-optical scanner 10 comprises a housing having a handle portion 12 and a cover portion 16. The handle portion 12 is shaped to conform to an operator's hand, and has a trigger switch 14 that enables the operator to initiate a bar code scanning operation. The handle portion 12 may be substantially hollow to permit circuit components or other elements, such as batteries, to be disposed therein. The cover portion 16 protects the electro-optical imaging elements, as will be described in greater detail below. It is anticipated that the housing be formed of a high strength, light weight material, such as plastic. The handle portion 12 may attach mechanically to the cover portion 16, such as by screws 18, enabling the cover portion to be removed as desired to provide access to the electro-optical imaging elements.

It should be apparent that various other alternative shapes for the handle portion 12 and cover portion 16 could also be advantageously utilized. For example, the handle portion 12 may be integrally formed with the cover portion 16 from a single piece of material. This would allow an airtight seal to be formed within the housing. Such a structure may be advantageous in discouraging end users from tampering with the internal components of the scanner 10, but would also hinder efforts to maintain and repair the scanner.

The cover portion 16 includes a front face 22 that defines the imaging direction for the electro-optical scanner 10. The front face 22 includes a window 24 that permits light to be transmitted into and out of the cover portion 16 to the internal electro-optical imaging elements. The window 24 may be substantially parallel to the front face 22, or may be disposed at an angle with respect to the front face. Also, the window 24 may be flush with the front face 22, or may be recessed a short distance from the front face. The window 24 protects the electro-optical imaging elements from any harmful contact or environmental damage, such as due to dirt, dust or moisture, and may be comprised of a clear material, such as glass or plastic.

In operation, the operator aims the scanner 10 by pointing the front face 22 and the window 24 in the general direction of a one or two-dimensional bar code symbology that is desired to be imaged. The operator then pulls the trigger 14, causing the electro-optical imaging elements to scan the bar code, as will be described in greater detail below. It should be readily apparent to those skilled in the art that any condensation or fogging of the window 24 would substantially impair operation of the scanner 10.

Referring now to FIG. 2, the internal aspects of the cover portion 16 are illustrated. In FIG. 2, the electro-optical imaging elements 30 comprise a laser device 32 and a mirror 34. The mirror 34 may be caused to articulate in a periodic manner by a motor 36 or other driving element. A laser beam generated by the laser device 32 is trained on the mirror 34, and the articulating motion of the mirror causes the laser beam to sweep back and forth. The laser beam transmits through the window 24, and reflects off the bar and space elements of a bar code. The articulating motion of the laser beam causes it to scan across the entire bar code. The reflected laser beam returns through the window 24, where it is detected by a light detecting element (not shown). Such articulating laser beam electro-optical imaging systems are well known in the art.

In FIGS. 2 and 3, heating elements $42_1$ and $42_2$ are affixed to upper and lower peripheral portions of the inner surface of the window 24, respectively. The heating elements $42_1$ and $42_2$ are comprised of a flexible substrate material, such as mylar, having an adhesive layer 44 that provides a physical bond between the heating elements and the window 24. The substrate material further has a resistive element provided thereon, such as resistive material that is printed onto the substrate by known photo-lithographic process. Electrical connection is made to the resistive element by conductors $46_1$ and $46_2$ that couple the heating elements $42_1$ and $42_2$ to a power source (described below with respect to FIG. 7).

The operation of the heating elements $42_1$ and $42_2$ should be apparent to those skilled in the art. Application of an electrical current to the heating elements $42_1$ and $42_2$ causes them to increase in temperature and warm the inner surface of the window 24. Heat from the heating elements $42_1$ and $42_2$ is effectively conducted across the entire inner surface of the window 24, until the inner surface has a temperature generally equal to or higher than the ambient air within the cover portion 16. Without a temperature differential between the inner surface of the window 24 and the ambient air within the cover portion 16, vaporized water droplets within the ambient air will not condense on the window.

The heating elements $42_1$ and $42_2$ are disposed at the upper and lower peripheral portions of the window 24 to prevent the heating elements from interfering with the articulating laser beam. It should be apparent that the defogging capability will improve as the width of the heating elements $42_1$ and $42_2$ increases and the elements extend closer to a central portion of the window 24; however, the heating elements cannot be too wide or else they will interfere with the path of the articulating laser beam. Accordingly, the width of the heating elements $42_1$ and $42_2$ can be selected to maximize the defogging capability without impairing operation of the electro-optical elements.

Figure 6:
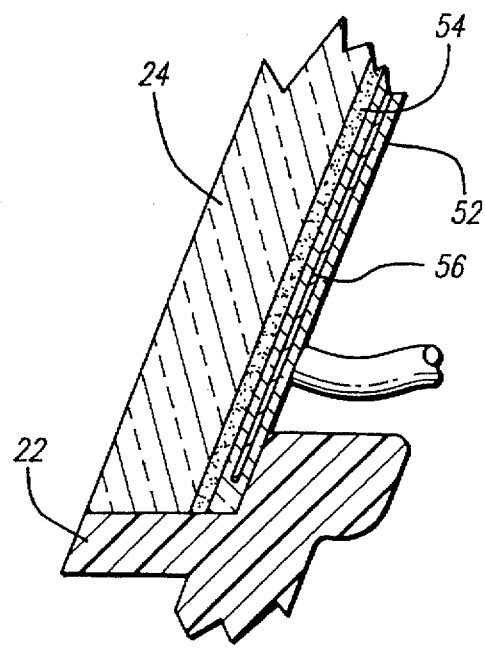
FIG. 6 is an enlarged sectional side view taken through the section 6—6 of FIG. 5.
Figure 5:
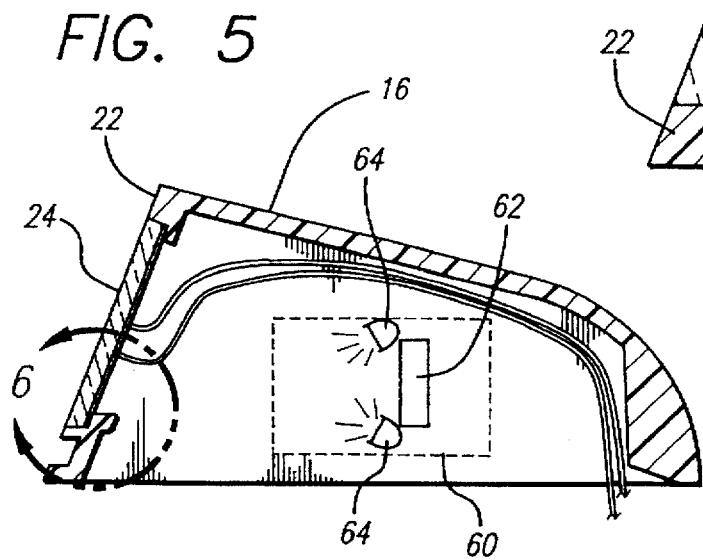
FIG. 5 is a partial sectional side view of the electro-optical scanner, taken through the section 5—5 of FIG. 4.

FIGS. 4 through 6 illustrate an alternative embodiment of the present invention. Externally, the scanner 10 of FIGS. 4 through 6 is substantially identical to the scanner illustrated in FIGS. 1 through 3, except that the scanner utilizes a different type of electro-optical element. As best shown in FIG. 5, the scanner 10 comprises an electro-optical element 60 that includes a charge coupled device (CCD) 62 and a plurality of light sources 64. The light sources 64 may comprise conventional incandescent light bulbs or light emitting diodes (LEDs). The electro-optical element 60 may further includes lenses, apertures or other optical elements (not shown) to alter the field of view and focusing characteristics of the CCD element 62.

When the scanner 10 is triggered by the operator, the light sources 64 are energized to illuminate a one or two-dimensional bar code that is desired to be scanned. Light from the light sources 64 reflects off the bar code, and forms an image of the bar code on the CCD element 62. The reflected image is then converted to gray-scale digital pixel information by the CCD element 62 in a conventional manner.

Since the scanner 10 of FIGS. 4 through 6 does not utilize an articulating laser beam, an alternative heating element 52 can be utilized that extends fully across the inner surface of the window 24. Like the heating element 42 described previously, the heating element 52 is comprised of a flexible substrate material, such as mylar, having an adhesive layer 54 that provides a physical bond between the heating element and the window 24. The substrate material further has a resistive element 56 provided thereon, such as resistive material that is printed onto the substrate by known photo-lithographic process. The resistive element 56 may comprise a very small gauge wire that traverses the substrate material in a serpentine pattern. Electrical connection is made to the resistive element 56 by conductor 46 that couples the heating element 52 to a power source (described below with respect to FIG. 7).

It should be apparent that the heating element 52 would provide more uniform temperature control over the inner surface of the window 24 since it covers the entire surface area of the window. As a result, the heating element 52 would be more effective in controlling fogging of the window 24 than the heating elements $42_1$ and $42_2$ described above. Since the CCD element 62 collects reflected light from a point distant from the window 24, the CCD would not be adversely affected by the resistive element 56, unlike the articulating laser beam electro-optical element. Accordingly, the embodiment of FIGS. 4 through 6 would be preferred for use with CCD element-type scanners, but it should also be apparent that the embodiment of FIGS. 1 through 3 could also be advantageously utilized with CCD element-type scanners.

Referring now to FIG. 7, a schematic diagram illustrates electrical connection of the heating element 52 having a resistive element 56. The scanner 10 includes a DC power source 72, such as five volts, that is electrically connected to the resistive element 56. The power source 72 may comprise rechargeable batteries within the scanner 10 that provide power to other elements of the scanner. The scanner 10 may also include a regulator 74 that controls the application of power to the heating element, such as a thermostatic regulator that activates the heating element 52 at a certain predetermined temperature range. Alternatively, the regulator 74 may be omitted so that the heating element 52 would operate constantly. It should be apparent that the heating element 42 of FIGS. 1 through 3 would be electrically connected in the same manner as the heating element 52.

Having thus described a preferred embodiment of scanner window fog preventer, it should be apparent to those skilled in the art that certain advantages of the within system have been achieved. It should also be appreciated that various modifications, adaptations, and alternative embodiments thereof may be made within the scope and spirit of the present invention.

For example, in another alternative embodiment of the present invention, the housing of the scanner 10 could be sealed in an airtight manner, and filled with an inert or non-reactive gas, such as argon. This way, there would be no condensation on the inner surface of the window 24 due to the absence of vaporized water droplets. Such an embodiment would not be preferred, however, since it would increase the manufacturing cost and complexity of the scanner 10. Moreover, the difficulty in servicing the scanner would also increase, requiring the resealing of the device each time it is opened for routine maintenance.

The invention is further defined by the following claims. What is claimed is:

1. A portable, handheld scanner having an electro-optical element for scanning a one or two-dimensional symbology, comprising:

a housing having an enclosed compartment containing said electro-optical element, said compartment further having a window permitting said electro-optical element to collect reflected light therethrough; and a heating element coupled to at least a portion of an inner surface of said window, wherein said heating element precludes condensation from forming on said inner surface of said window.

2. A portable, handheld scanner having an electro-optical element for scanning a one or two-dimensional symbology, comprising:

a housing having an enclosed compartment containing said electro-optical element, said compartment further having a window permitting said electro-optical element to collect reflected light therethrough; and means for precluding condensation from forming on an inner surface of said window, wherein said condensation precluding means further comprises a heating element coupled to at least a portion of said inner surface of said window.

3. The scanner of claim 2, wherein said heating element further comprises a resistive element.

4. The scanner of claim 2, wherein said heating element further comprises an adhesive layer permitting attachment to said portion of said inner surface of said window.

5. The scanner of claim 2, wherein said heating element is coupled to an outer peripheral portion of said inner surface of said window.

6. The scanner of claim 2, further comprising a DC power source coupled to said heating element.

7. In a portable, handheld scanner used for scanning a one or two-dimensional bar code symbology, a defogging apparatus comprises:

a housing having an electro-optical element and a window permitting said electro-optical element to collect reflected light therethrough; and a heating element coupled to at least a peripheral portion of said inner surface of said window;

wherein, application of an electrical current to said heating element heats said window and precludes condensation from forming on said inner surface of said window.

8. The apparatus of claim 7, wherein said heating element further comprises a resistive element.

9. The apparatus of claim 7, wherein said heating element further comprises an adhesive layer permitting attachment to said portion of said inner surface of said window.

10. The apparatus of claim 7, wherein said electro-optical element further comprises a charge coupled device.

11. The apparatus of claim 7, wherein said electro-optical element further comprises a laser.

12. A portable, handheld symbology scanning apparatus comprising:

a housing having an enclosed compartment containing an electro-optical element, said compartment further having a window permitting said electro-optical element to collect reflected light therethrough; and means for precluding condensation from forming on an inner surface of said window, said condensation precluding means further comprising a heating element coupled to at least a portion of said inner surface of said window.

13. The scanning apparatus of claim 12, wherein said heating element further comprises a resistive element.

14. The scanning apparatus of claim 12, wherein said heating element further comprises an adhesive layer permitting attachment to said portion of said inner surface of said window.

15. The scanning apparatus of claim 12, wherein said heating element is coupled to an outer peripheral portion of said inner surface of said window.

16. The scanning apparatus of claim 12, wherein a remaining portion of said window remains unobstructed by said heating element.

* * * * *